UNITED STATES PATENT OFFICE.

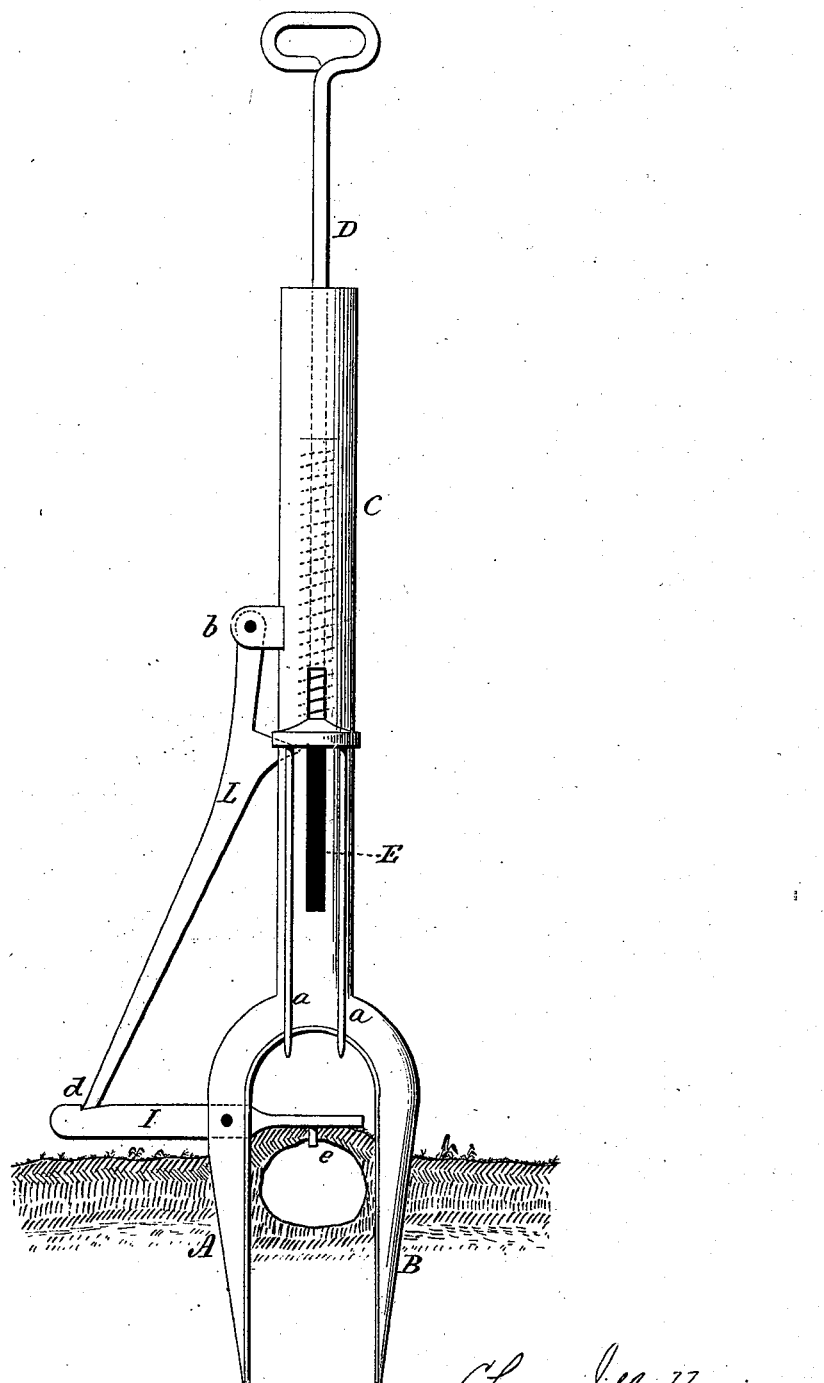

CHARLES ISBELL, OF HOTCHKISSVILLE, CONNECTICUT.

IMPROVEMENT IN ANIMAL-TRAPS.

Specification forming part of Letters Patent No. 210,040, dated November 19, 1878; application filed October 5, 1878.

*To all whom it may concern:*

Be it known that I, CHAS. ISBELL, of Hotchkissville, in the county of Litchfield and State of Connecticut, have invented a new Improvement in Mole-Traps; and I do hereby declare the following, when taken in connection with the accompanying drawing and the letters of reference marked thereon, to be a full, clear, and exact description of the same, and which said drawing constitutes part of this specification, and represents a front view.

This invention relates to an improvement in that class of traps for catching moles, and commonly called "mole-traps."

In the usual construction of these traps they are made of fork shape, the two tines inserted into the ground to span the burrow, and the trip arranged so as to lie upon the surface of the ground; and in setting the trap the ground is depressed so as to wholly or partially close the burrow, and the trip is arranged to lie upon that depressed surface, expecting that when the mole next passes through the burrow he will attempt to open that closed portion, and in doing so raise the trip and discharge the forks to catch him in the act of so doing; but it is found that the mole will not with any degree of certainty so operate. Finding his passage closed, he is quite as liable to turn away in another direction as to pass on.

The object of this invention is to construct the trap so that the closing of the burrow is unnecessary; and it consists in the combination of a pair of prongs, by which the trap is secured in the earth, carrying a vertical cylinder with a spring-slide arranged therein, prongs on said slide for striking the mole, a latch for holding said striking-prongs suspended, and a trip for said latch, provided with a projection to enter the earth raised by the mole, whereby the closing of the path of the mole in setting the trap is avoided.

A represents one prong, and B the other, of the fork, extending up to form a hollow shank, C, within which a vertical slide, D, is arranged, with arms extending out to a slot, E. These arms carry the piercing-tines $a$, more or less in number, the tines forced downward by a spring within the cylinder C, and which is compressed when the tines are raised in a set position; and when so raised they are supported by a latch, L, one end of which, $b$, is hinged to the cylinder C, the other caught in a notch, $d$, in the trip I, this trip I hung to one of the prongs and extending between them, as shown, and substantially as in previous constructions.

On the trip I, between the prongs, a downward projection, $e$, is made, so as to stand about midway between the prongs when the trap is set, and of sufficient length to extend down into the burrow, leaving the arm of the trip above; hence the depressing of the burrow, so that the trip may lie so low down that the opening of the burrow will be required to raise the fork, is avoided.

The projection $e$ extending into the burrow, the mole must necessarily strike that projection, and in doing so will positively raise the trip and cause the trap to act, the projection itself offering no apparent obstruction to the progress of the mole in the burrow.

I claim—

The combination of the prongs A B, carrying a cylinder, C, above, slide D, and spring thereon within the cylinder, prongs $a$ $a$, attached to the slide D, the hinged latch L, and trip I, provided with downward projections $e$, substantially as described.

CHARLES ISBELL.

Witnesses:
 NELLIE A. WILLIAMS,
 W. H. WILLIAMS.